United States Patent [19]
Miller et al.

[11] Patent Number: 5,802,661
[45] Date of Patent: Sep. 8, 1998

[54] MULTIPLE WINDSHIELD WIPER BLADE ASSEMBLY

[75] Inventors: James M. Miller, Seattle; Walter L. Webb, Mukilteo, both of Wash.

[73] Assignee: Choice, Inc., Seattle, Wash.

[21] Appl. No.: 960,923

[22] Filed: Oct. 30, 1997

[51] Int. Cl.[6] ...................................................... B60S 1/38
[52] U.S. Cl. ................... 15/250.41; 15/245; 15/250.361
[58] Field of Search .............................. 15/250.41, 250.4, 15/250.43, 250.44, 245, 250.11, 103, 250.19, 250.361, 184

[56] References Cited

U.S. PATENT DOCUMENTS

| | | | |
|---|---|---|---|
| 2,187,876 | 1/1940 | Ericson | 16/250.41 |
| 2,537,411 | 1/1951 | Klingler | 15/250.43 |
| 2,658,223 | 11/1953 | Enochian | 15/250.43 |
| 2,798,242 | 7/1957 | Zeininger et al | 15/250.41 |
| 3,892,006 | 7/1975 | Yasumoto | 15/250.22 |
| 4,339,838 | 7/1982 | Pekarek | 15/245 |
| 4,745,653 | 5/1988 | Bliznak | 15/250.04 |
| 5,168,595 | 12/1992 | Naylor | 15/250.4 |
| 5,189,752 | 3/1993 | Longacre | 15/250.41 |
| 5,255,407 | 10/1993 | Yang | 15/250.22 |

*Primary Examiner*—Gary K. Graham
*Attorney, Agent, or Firm*—Christensen, O'Connor, Johnson & Kindness PLLC

[57] ABSTRACT

A wiper blade assembly (10) is provided including a housing (12), two blades (14), (16), two blade support structures (18), (20), and a switching mechanism (22). The housing (12) includes a shell (26) having two longitudinal channels (28), (28'). The housing (12) further includes a lower opening (36) and a bottom plate (38) sized to cover the lower opening. The bottom plate (38) is releasably connected to the shell (26) and includes two slots (40). An inner seal (46) attaches to an interior surface of the bottom plate and includes slots (48) that align with the bottom plate slots (40). The blades (14), (16) and blade support structures (18), (20) are positioned within the housing channels and are aligned with the bottom plate slots. Each support structure includes a middle portion having a transverse central hole (54). The switching mechanism (22) includes a shaft (62) and first and second cams (70), (72) attached to the shaft. The first cam (70) is held within the transverse hole of the first support structure (18) and the second cam (72) is held within the transverse hole of the second support structure (20). During use, the switching mechanism (22) causes at least one blade to extend through its respective slot and at least one blade to be retracted within the housing (12).

11 Claims, 3 Drawing Sheets

MULTIPLE WINDSHIELD WIPER BLADE ASSEMBLY

FIELD OF THE INVENTION

The present invention relates to windshield wipers for use with vehicles such as automobiles, boats, trains, and trucks; and more particularly, to vehicle windshield wipers having multiple wiper blades.

BACKGROUND OF THE INVENTION

Current windshield wipers typically include a single blade attached to a single blade support structure. The blade support structure is attached to a pivoting arm that is connected to the vehicle near a windshield. When the blade wears out or becomes damaged, the user must change either the blade or both the blade and its support structure.

In the past, attempts have been made to improve upon the functionality of conventional windshield wipers. For example, U.S. Pat. No. 2,187,876 discloses a windshield wiper assembly for automobiles containing a conventional wiper blade and a separate hard edged element movable into engagement with a windshield, for removing sleet and ice from the windshield.

U.S. Pat. No. 3,892,006 discloses a rotatable, multi-bladed windshield wiper assembly having a plurality of radially-spaced blade pairs fixed to a rotatable flexible shaft. The wiper assembly further includes a locking mechanism that allows the assembly to rotate freely when moved in one direction along a wiping pass and to be locked to retain a single blade pair in wiping contact with the windshield on the return pass.

U.S. Pat. No. 4,745,653 discloses a rotatable, multi-edged wiper blade assembly in which the blade includes multiple types of surfaces for use in varying weather conditions. The rotatable blade is designed to have two opposing blade edges simultaneously in contact with a windshield, facing in opposite directions so that the forwardly pointing edge serves a scraping function and the rearwardly pointing edge serves a wiping function.

U.S. Pat. No. 5,168,595 discloses a windshield wiper assembly having two blades, and means for pivoting the first blade into a position for contacting the windshield and the second blade into a first position spaced from the windshield, or into a second position in which the first blade is spaced from the windshield and the second blade is faced in contacting relationship with the windshield. The blades may be made from different compositions, to perform different cleaning tasks, such as removing ice or insects.

U.S. Pat. No. 5,189,752 discloses a twin or triple windshield wiper carrier and blade unit, in which the wiper blades are maintained in fixed relationship with respect to each other for simultaneous contacting of a windshield surface.

U.S. Pat. No. 5,255,407 discloses a windshield wiper assembly having at least one rotatable roller scrubber mounted for engagement with a windshield of a vehicle. The roller scrubbers are provided with internal stops enabling the scrubber to rotate in one direction only.

Despite advances in the art, current wipers still suffer from a number of disadvantages. One disadvantage is that once a blade is worn out, it should be replaced immediately. This inconveniently requires that the user go to an auto-parts store, determine the blade needed, and install the blade on the vehicle. To make matters worse, most blade attachment designs are frustratingly complicated and are a source of aggravation to the user. If the user chooses to continue using the worn blade, it will typically smear water and dirt across the windshield instead of wiping it clean. This can result in a dangerous driving condition.

Thus, a need exists for a wiper blade assembly that reduces the inconvenience of current blades and blade support structures by alleviating the need to immediately replace a worn blade, while continuing to provide superior blade wiping action. The ideal assembly should be easy to install and easy to operate. The present invention is directed to fulfilling this need.

SUMMARY OF THE INVENTION

In accordance with aspects of the present invention, a blade assembly is provided including a housing, at least two blades and blade support structures, and a switching mechanism. The housing preferably includes a shell having two longitudinal channels and a lower opening. The housing further includes a bottom plate that is sized to cover the lower opening and that is releasably connected to the shell. In one embodiment, the bottom plate is rotatably connected to the shell via a number of living hinges. In a second embodiment, the bottom plate is slidably engaged with the shell. The bottom plate includes at least two slots that are generally aligned with the shell channels. The blades and blade support structures are positioned within the housing channels and are connected to the housing shell. Each blade aligns longitudinally with a bottom plate slot.

During use, the switching mechanism causes at least one blade to extend through its respective slot into wiping engagement with a windshield, preferably positioning the other blades entirely within the housing. When the extended blade become worn, the switching mechanism is adjusted to retract the worn blade and to extend a fresh blade into wiping engagement with the windshield. This enables the user to continue traveling without having to immediately replace the worn blade.

In accordance with other aspects of this invention, an inner seal is attached to an interior surface of the bottom plate and includes two slots corresponding to the bottom plate slots. The inner seal is preferably formed from an elastomeric organic polymer material such as rubber, silicon, and the like.

In accordance with presently preferred aspects of this invention, two blades and two support structures are provided. The switching mechanism includes a shaft and first and second cams attached to the shaft. Each support structure includes a central transverse hole. The first cam is located within one support structure transverse hole and the second cam is located within the other support structure transverse hole. The first and second cams are oriented in different directions, with a preferred angle therebetween in the range of about 90 to 180 degree. By rotating the shaft, the cams cause one support structure and/or supported blade to extend through a bottom plate slot enabling wiping engagement of the blade with a windshield, and the other support structure and blade to retract into the housing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
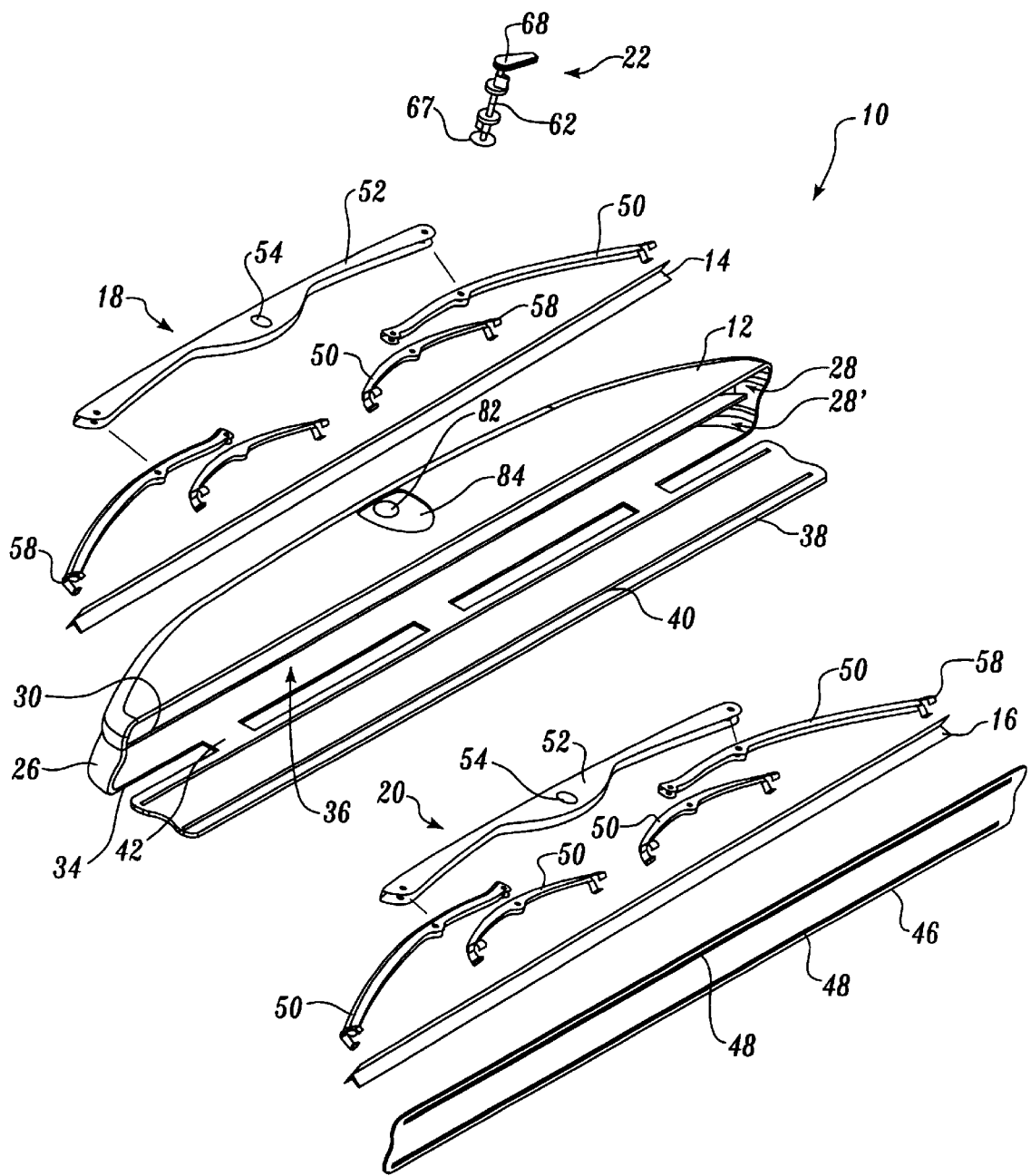
FIG. 1 is an exploded perspective view of one embodiment of a blade assembly formed in accordance with the present invention.

Shown in FIGS. 1–4 is one embodiment of a windshield wiper blade assembly 10 formed in accordance with the present invention. The assembly 10 includes a housing 12 capable of sheltering multiple windshield wiper blades. A two-blade housing is shown in FIG. 1, although it will be apparent to those skilled in the art that the inventive concepts may be readily used in assemblies employing three or more blades. In the illustrative embodiment of FIG. 1, first and second blades 14, 16 are each attached to a support structure 18, 20, respectively. Both the blades 14, 16 and support structures 18, 20 are located substantially within the housing 12. During use, one support structure is held in an extended position in which its corresponding blade partially extends from the housing in order to permit wiping engagement with a windshield. The other support structure is held in a retracted position in which its corresponding blade is positioned entirely within the housing and therefore does not make contact with the windshield. A blade switching mechanism 22 is provided to allow the user to alternate between blades. When the extended blade becomes worn, the switching mechanism is adjusted to retract the worn blade and to extend a fresh blade into wiping engagement with the windshield. This enables the user to continue use of a vehicle without having to immediately replace the worn blade.

In more detail and referring to the representative embodiment of FIG. 1, the housing 12 comprises an elongated shell 26 having two adjacent longitudinal channels 28, 28' separated by a partition 30. The shell may be formed to define a concave curved upper surface 32 (see FIG. 2A) that slopes to a generally linear lower edge 34. The lower edge 34 encompasses a lower opening 36. The housing 12 further comprises a bottom plate 38 that is sized to cover the shell lower opening 36. Both the lower opening 36 and bottom plate 38 are preferably slightly curved in order to conform to the shape of a conventional automobile windshield during use. FIG. 2B illustrates the bottom plate 38 in an operative position in which the bottom plate covers the shell lower opening 36. The bottom plate 38 includes a number of longitudinal slots 40 through which the wiper blades can extend.

The bottom plate 38 shown in the illustrative embodiment of FIG. 1 is integrally formed with the elongated shell 26. Flexible living hinges 42 extend between the shell lower edge 34 and an edge of the adjacent bottom plate. The shell 26 and bottom plate 38 are preferably formed from durable molded plastic or other weather resistant material. Other types of connections between the bottom plate 38 and the housing 12 may be used, e.g., pin hinges, clamps, snap fittings, screws, slide and grooves, etc., that permit the bottom plate 38 to be positionable away from the shell lower opening 36 to allow the user to change the blades and/or the support structures as required. In another preferred embodiment, the bottom plate and shell are separately formed and are joined by a pivotable shaft that allows the bottom plate to swing open similar to a door. A holding tab keeps the bottom plate in the shut position. In yet another preferred embodiment, the shell lower edges are formed with channels or grooves that slidably engage the bottom plate. Alternatively, the bottom plate may be formed with channels slidably engaging the shell.

Still referring to FIG. 1, the housing 12 may further comprise an inner seal 46 attached to an interior surface of the bottom plate 38. In the illustrative embodiment shown in FIG. 1, the inner seal 46 comprises a number of longitudinal slots 48 that correspond in number and location to the bottom plate slots 40. In preferred embodiments, the inner seal 46 is releasably attached to the bottom plate 38 so that the inner seal may be easily replaced when worn. The inner seal 46 is preferably formed from a flexible material in a manner that discourages the influx of water and debris into the housing 12. Preferred materials in elastomeric organic polymers such as rubber, silicon, sanaprene, etc.

The blades 14, 16 and blade support structures 18, 20 are located substantially within the shell 26, with one structure being positioned in each channel. The blades 14, 16 and support structures 18, 20 are conventionally configured, though sized to fit the slots and channels of the present invention. Shown in FIG. 1 is a support structure having four arms 50 and six blade-engaging clamps 58 that grip a single blade. The four arms 50 connect to a main arm 52. The main arm 52 includes a middle portion through which extends a transverse central hole 54. The central hole provides means for connecting the support structure to the housing and to the switching mechanism as described below.

Figure 4A:
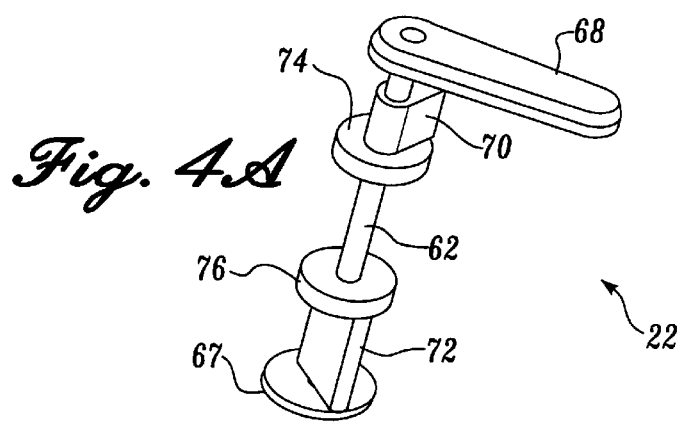
FIG. 4A is a detail perspective view of one embodiment of a switching mechanism for use in the blade assembly of FIG. 1.
Figure 4B:
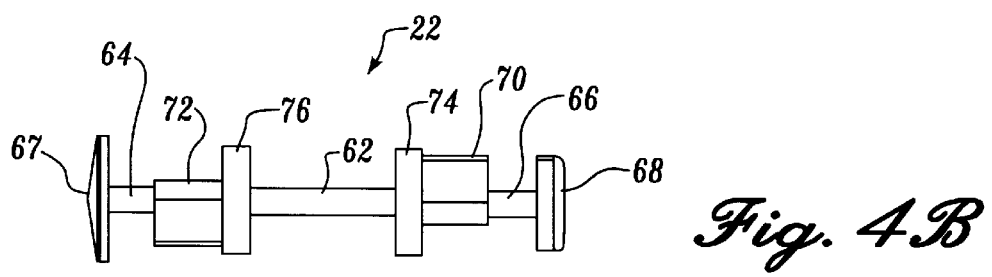
FIG. 4B is a side view of the switching mechanism of FIG. 4A.

Illustrated in FIGS. 4A and 4B is one embodiment of a switching mechanism 22. The mechanism comprises a shaft 62 having distal and proximal ends 64, 66. An end cap 67 is detachably connected to the shaft distal end 64. A lever 68 is attached to the shaft proximal end 66. The switching mechanism 22 further comprises first and second cams 70, 72 and first and second circular supports 74, 76. The lever and cams are affixed to the shaft such that rotation of the lever 68 causes like rotation of the shaft 62 and the cams 70, 72. The placement of components along the shaft 62 (moving from the distal shaft end 64 to the proximal shaft end 66) is first the end cap 67, then the second cam 72, the second circular support 76, the first circular support 74, the first cam 70, and the lever 68.

Figure 2A:
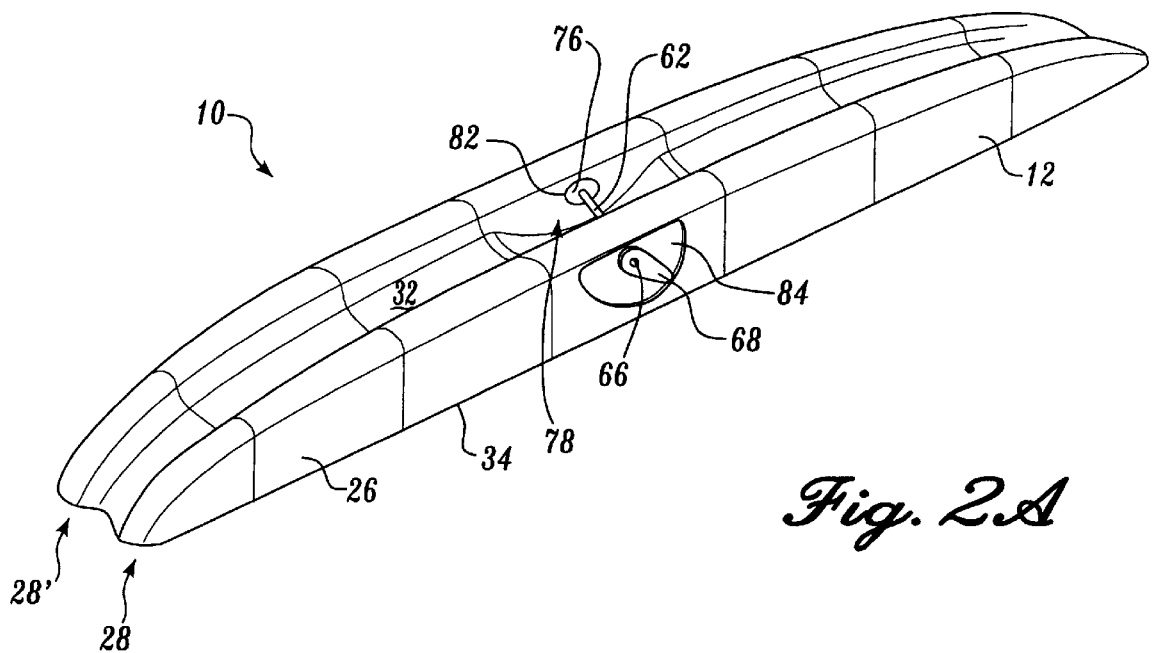
FIGS. 2A and 2B are top-down and bottom-up perspective views of the assembled blade assembly of FIG. 1.
Figure 2B:
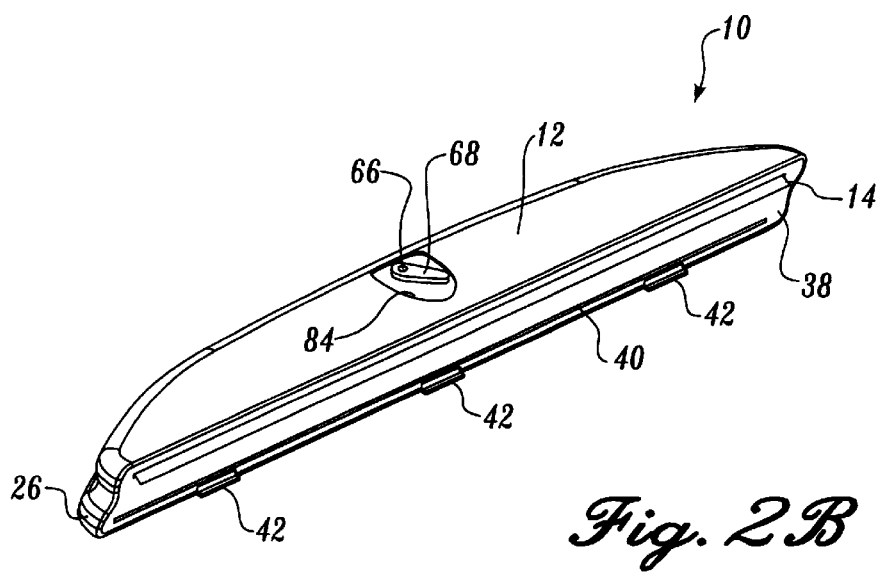

As shown best in FIG. 2A, the shell upper surface 32 includes an inwardly recessed middle portion 78 located between the longitudinal channels 28, 28'. The exterior surfaces of the inboard channel sidewalls form upright longitudinal sidewalls to the recessed middle portion 78. A transverse hole 82 extends through the shell channels at the middle portion. The transverse hole 82 is diametrically sized similar to the diameter of the circular supports 74, 76. The switching mechanism 22 shaft is positioned through the transverse hole 82, with the end cap and lever being located on the exterior of the shell. In preferred embodiments, the exterior surface of the shell includes a lever recess 84 within which the lever 68 can be rotated. Notches (not shown) in the recess 84 prohibit inadvertent lever movement and provide the user with tactile feedback as to when the lever is in an operative position.

The switching mechanism first and second circular supports 74, 76 are maintained in the recessed middle portion upper longitudinal sidewalls. As shown best in FIGS. 3A and 3B, the second support structure 20 is positioned within the second channel 28'. The switching mechanism second cam 72 is maintained within the central hole 54 of the second support structure 20. In a similar manner, the first support structure 18 is positioned within the first channel 28. The switching mechanism first cam 70 is maintained within the central hole 54 of the first support structure 18.

In the illustrative embodiment shown in FIGS. 2–4, the switching mechanism 22 has two basic operative positions. In one position, the switching mechanism causes the first blade 14 to extend outward through the inner seal and bottom plate slots 48, 40 and past the exterior surface of the bottom plate 38. When the blade assembly 10 is attached to a wiper arm, the first blade 14 will be placed in wiping engagement with a windshield. The second blade 16 is held within the housing 12. In the other basic switching mechanism operative position, the blade positions are reversed— the first blade 14 is retracted within the housing 12 and the second blade 16 extends from the housing 12 to contact the windshield.

To switch the blades between their retracted and extended positions, the lever 68 is rotated between its operative positions. Rotation of the lever causes like rotation of the shaft 68 and the first and second cams 70, 72. Because the axes of rotation of each cam is offset from its centerline, one side of the cam is radially larger than the other side. When each cam is rotated, it rotates within the blade support structure main arm central hole. This results in at least one of the blade structures being moved downward and its respective blade being pushed through the inner seal and bottom plate slots 48, 40.

Figure 3A:
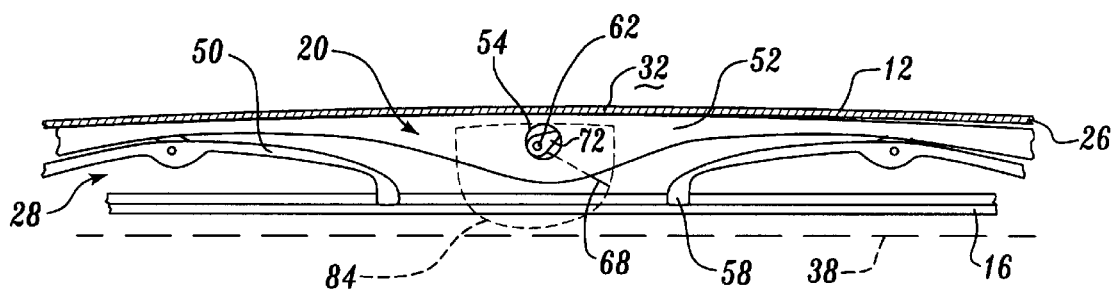
FIGS. 3A and 3B are cross-sectional side views of the blade assembly of FIG. 1 showing one blade and support structure in retracted and extended positions, respectively.
Figure 3B:
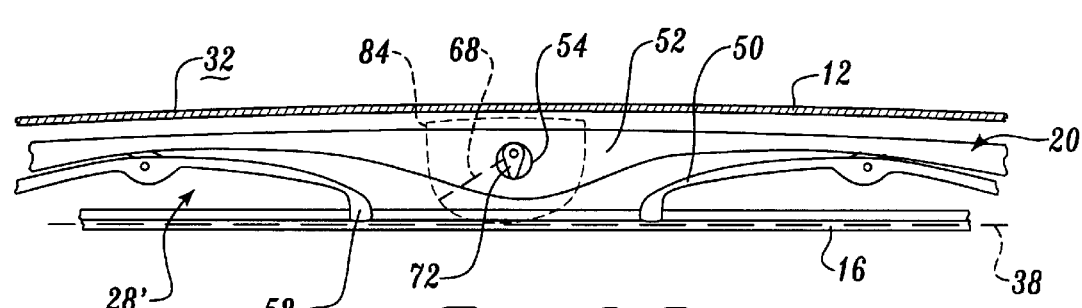

In more detail, referring to FIG. 3A, the second support structure 20 is shown in a retracted position causing the second blade 16 to be located entirely within the housing 12. The second cam 72 is oriented approximately 70° clockwise from straight up (relative to the orientation of the illustration). The first cam 70 (not shown in FIGS. 3A and 3B) is pointing straight down which causes the first blade 14 to extend through the blade slots 48, 40 of the inner seal 46 and the bottom plate 38, respectively. In FIG. 3B, the lever 68 has been rotated 110° clockwise so that the second cam 72 is now pointing down and the first cam 70 is oriented approximately 70° counter-clockwise from vertical. In this configuration, the second blade 16 is now in an extended position and the first blade 14 is in a retracted position (not shown). Thus, the second blade 16 extends outward from the housing 12 through the slots of the inner seal and bottom plate.

For a two-blade assembly, it is preferred that the cams 70, 72 are pointed in different directions such that the angle between the cams is in the range of about 90 to 180 degrees. In general, the angle will depend upon the number of blades provided with the assembly and the size of the assembly components. As will be appreciated from viewing FIGS. 3A and 3B, it is important that the cams be capable of rotating within the support structure central holes. Otherwise, the switching mechanism 22 will not rotate smoothly, but instead will jam or break.

To install the blade assembly 10 to a conventional automobile rotating wiper arm, the first and second blades 14, 16 are secured to their respective support structures 18, 20. The shell bottom plate 38 is moved to reveal the shell lower opening 36. The support structures 18, 20 with blades 14, 16 are positioned within the shell channels 28, 28'. The switching mechanism end cap 67 is disconnected from the shaft 62. The shaft 62 is inserted (distal end first) through the shell middle portion transverse hole 82 until the circular supports are aligned with the upright longitudinal sidewalls of the shell middle portion recess 78. In this position, the distal shaft end 64 extends to the opposite side of the shell, where the end cap 67 is then reattached. Also in this position, the first cam 70 is located in the central hole 54 of the first support structure 18; the second cam 72 is located in the central hole 54 of the second support structure 20; and the lever 68 is located within the lever recess 84. The inner seal 46 is connected to the bottom plate 38. The bottom plate 38 is positioned to cover the lower opening 36. The lever 68 is positioned such that one of the first and second blades 14, 16 extends through its respective bottom plate slot. Finally, the wiper arm is attached to the exposed switching mechanism shaft at the location of the shell upper surface middle portion recess.

To change a worn blade, the housing 12 is opened and the worn blade is removed. It is easiest to remove the worn blade when its corresponding support structure is placed in an extended position, since there is then additional clearance to slide the blade out from the support structure blade-engaging clamps 58. Alternatively, an entire support structure may be replaced.

As will be appreciated from a reading of the above, the present invention blade assembly reduces the inconvenience currently associated with conventional blades and blade support structures. The present invention is easy to assembly and enables the user to quickly switch blade positions to expose a fresh blade. This eliminates the need to immediately replace a worn blade, while continuing to provide superior blade wiping action. The housing 12 and inner seal help keep water and debris from the components which further increases the life of the assembly.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A wiper blade assembly comprising:
   (a) a housing including a shell having a lower opening, the housing including a bottom plate connected to the shell at the lower opening, the bottom plate including at least two slots;
   (b) at least two wiper blades mounted respectively in blade support structures, the wiper blades and blade support structures being positioned within the housing at locations aligned with the bottom plate slots; and
   (c) a switching mechanism coupling the at least two support structures with the housing; the switching mechanism for selectively causing at least one wiper blade to extend through its respective bottom plate slot.

2. The wiper blade assembly according to claim 1, further including an inner seal attached to an interior surface of the bottom plate and including at least two slots in alignment with the bottom plate slots.

3. The wiper blade assembly according to claim 2, wherein the inner seal includes an elastomeric organic polymer material.

4. The wiper blade assembly according to claim 1, wherein the bottom plate is rotatably connected to the shell via a plurality of living hinges.

5. The wiper blade assembly according to claim 1, wherein the bottom plate is slidably engaged with the shell.

6. The wiper blade assembly according to claim 1, wherein the bottom plate is hingedly engaged with the shell.

7. The wiper blade assembly according to claim 1, wherein during use only one blade extends through the housing and the other blades are positioned entirely within the housing.

8. The wiper blade assembly according to claim 1, wherein the switching mechanism includes a shaft and at least first and second cams attached to the shaft; and wherein each support structure includes a transverse hole, the first cam being located within one support structure transverse hole and the second cam being located within another support structure transverse hole.

9. The wiper blade assembly according to claim 8, wherein the first and second cams are pointed in different directions, the angle between the directions being in the range of about 90 to 180 degrees.

10. The wiper blade assembly according to claim 1, wherein the at least two blades and support structures includes two blades and two support structures.

11. A wiper blade assembly comprising:
   (a) a housing including a shell having two longitudinal channels and a lower opening, the housing including a bottom plate sized to cover the lower opening and releasably connected to the shell, the bottom plate including two slots aligned with the shell channels;
   (b) first and second wiper blades mounted respectively in first and second support structures, the blades and blade support structures being positioned within the housing channels and aligned with the bottom plate slots, each support structure including a middle portion having a transverse hole;
   (c) an inner seal attached to an interior surface of the bottom plate and including two slots positioned to align with the bottom plate slots; and
   (d) a switching mechanism including a shaft coupled with the housing and first and second cams attached to the shaft, the first cam being held within the first support structure transverse hole and the second cam being held within the second support structure transverse hole; whereby during use, the switching mechanism causes at least one blade to extend through its respective slot and at least one blade to be retracted within the housing.

* * * * *